(12) United States Patent
Pasley et al.

(10) Patent No.: US 10,401,130 B2
(45) Date of Patent: Sep. 3, 2019

(54) GLOVE FOR INCAPACITATING AN INDIVIDUAL

(71) Applicants: Henry E. Pasley, Las Vegas, NV (US); Jason J. Wu, Las Vegas, NV (US); Li-Jun Shen, Shanghai (CN)

(72) Inventors: Henry E. Pasley, Las Vegas, NV (US); Jason J. Wu, Las Vegas, NV (US); Li-Jun Shen, Shanghai (CN)

( * ) Notice: Subject to any disclaimer, the term of this patent is extended or adjusted under 35 U.S.C. 154(b) by 317 days.

(21) Appl. No.: 15/347,155

(22) Filed: Nov. 9, 2016

(65) Prior Publication Data

US 2018/0128580 A1 May 10, 2018

(51) Int. Cl.
| | |
|---|---|
| *A41D 1/00* | (2018.01) |
| *F41H 1/02* | (2006.01) |
| *H02H 5/08* | (2006.01) |
| *F41H 13/00* | (2006.01) |
| *A41D 19/015* | (2006.01) |

(52) U.S. Cl.
CPC ......... *F41H 13/0018* (2013.01); *A41D 1/005* (2013.01); *A41D 19/01505* (2013.01); *F41H 13/0087* (2013.01); *H02H 5/083* (2013.01); *F41H 1/02* (2013.01)

(58) Field of Classification Search
CPC .... F41H 13/0018; F41H 13/0087; F41H 1/02; A41D 1/005; A41D 19/001; A41D 19/01505; H05K 5/0017; H02H 5/083
USPC ...................................................... 361/232
See application file for complete search history.

(56) References Cited

U.S. PATENT DOCUMENTS

| | | | | |
|---|---|---|---|---|
| 4,486,807 A | * | 12/1984 | Yanez ................. | F21V 33/0064 361/232 |
| 2009/0021883 A1 | * | 1/2009 | Delida ................ | F41H 13/0018 361/230 |
| 2012/0243141 A1 | * | 9/2012 | Schweitzer ......... | F41H 13/0018 361/232 |
| 2012/0298119 A1 | * | 11/2012 | Reese .................... | E05B 75/00 128/875 |
| 2014/0022688 A1 | * | 1/2014 | Jones .................. | F41H 13/0018 361/232 |

\* cited by examiner

*Primary Examiner* — Kevin J Comber

(57) ABSTRACT

Disclosed is the glove worn by a user for incapacitating an individual. The glove includes a housing configured to cover palm and fingers of the user, the housing having a palm side layer for covering the front part of the hand and a backside layer for covering the back part of the hand; a circuit control unit configured on the backside layer having an anesthesia electrical wave generator for generating anesthesia electrical wave for incapacitating the individual; a power source configured on the palm side layer to power the circuit control unit; wherein the palm side layer having a first cutting resistance layer to protect the user's hand from foreign particles. Further, the palm side layer includes a flexible electrode layer, a pressure sensor, a water proof insulation layer, a first knitting cloth layer. Further, the backside layer includes a backside leather layer and a second knitting cloth layer.

10 Claims, 6 Drawing Sheets

GLOVE FOR INCAPACITATING AN INDIVIDUAL

BACKGROUND OF THE INVENTION

1. Field of the Invention

The present invention generally relates to a glove for incapacitating an individual, and more particularly relates to a glove for incapacitating an individual by providing anesthesia effect.

2. Description of Related Art

Current events have spotlighted many tragic occurrences resulting from law enforcement trying to perform their duties but accidentally injuring or killing a non-compliant individual. In many of these occasions in the process of apprehending the non-compliant individual, where deadly force was used when, if available, the non-lethal approach would have been sufficient.

There has also been the occasion when it has taken multiple law enforcement or corrections officers to subdue one non-compliant individual, which usually resulted in charges of excessive force or police brutality. Another reality for law enforcement is that in addition to the violent situation the individual may be carrying some contagious diseases which creates more difficulties for law enforcement officers to accomplish their duties.

Unfortunately, the existing non-lethal tools available to law enforcement in many instances are inappropriate or ineffective. These non-lethal tools have existed for years. Crowd control sticks such as electrical batons allow for users such as law enforcement personal to generate an electrical shock at the end of an elongated stick. However, the batons do not allow the user to properly control the individual.

In more recent years, the popular "tazar" type device allows an officer to grip a handheld weapon that emits a visible electric lightening type signal between two outer electrodes. However, these handheld "tazars" must be constantly gripped by the officer who is restricted from using that same hand and fingers for anything else. If during the engagement with the assailant, the individual interferes with the grip of the officer, the "tazer" can ultimately be taken away by an overpowering assailant and thus could even act against the officer.

Therefore, there is a need of a glove for incapacitating an individual by providing anesthesia effect on the individual. Further, the glove should be non-lethal to provide no more than the required harm to the individual. Further, the glove generates low electrical pulse, thus the individual returns to normal without having any lasting physical effect after the gasp is released.

SUMMARY OF THE INVENTION

In accordance with the teachings of the present invention a glove worn by a user for incapacitating an individual is provided.

An object of the present invention is to provide housing configured to cover palm and fingers of the user, a circuit control unit for generating anesthesia electrical wave for incapacitating the individual; and the power source to power the circuit control unit.

Another object of the present invention is to provide the housing including a palm side layer for covering the front part of the hand and a backside layer for covering the back part of the hand. The palm side layer includes a flexible electrode layer configured to transfer the generated anesthesia electrical wave received from the circuit control unit to the individual.

Another object of the present invention is to provide the palm side layer having a first cutting resistance layer configured beneath the flexible electrode layer to protect the user's hand from foreign particles; a pressure sensor configured beneath the cutting resistance layer to activate the flexible electrode layer only on exceeding pre-stored pressure value grasping the individual by the user; and first knitting cloth layer configured to be the innermost layer next to palm of the user.

Another object of the present invention is to provide the backside layer including a backside leather layer configured to protect the user's hand, and a second knitting cloth layer configured to be the innermost layer next to the back of the hand of the user.

Another object of the present invention is to provide a disposable battery storage unit configured to store the power source in the housing, a display unit configured on the backside layer to display the status of the power source, and a switch unit configured on the backside layer to display the status of the power source.

Another object of the present invention is to provide the circuit control unit with a tracking unit to track the usage time of the power source. Further, the tracking unit tracks the location of the housing and further records the usage time information and housing location information.

Another object of the present invention is to provide the circuit control unit with a water sensor to detect soaking level. The water sensor further shuts down power to the circuit control unit on recording soaking level higher than the pre-stored soaking level.

Another individual of the present invention is to provide a light emitting source configured in the housing for generating a light to obstruct the vision of the individual before executing the grasp of the user. The light emitting source is connected to the switch unit and the power source.

These and other features and advantages will become apparent from the following detailed description of illustrative embodiments thereof, which is to be read in connection with the accompanying drawings.

DETAILED DESCRIPTION OF DRAWINGS

Figure 1:
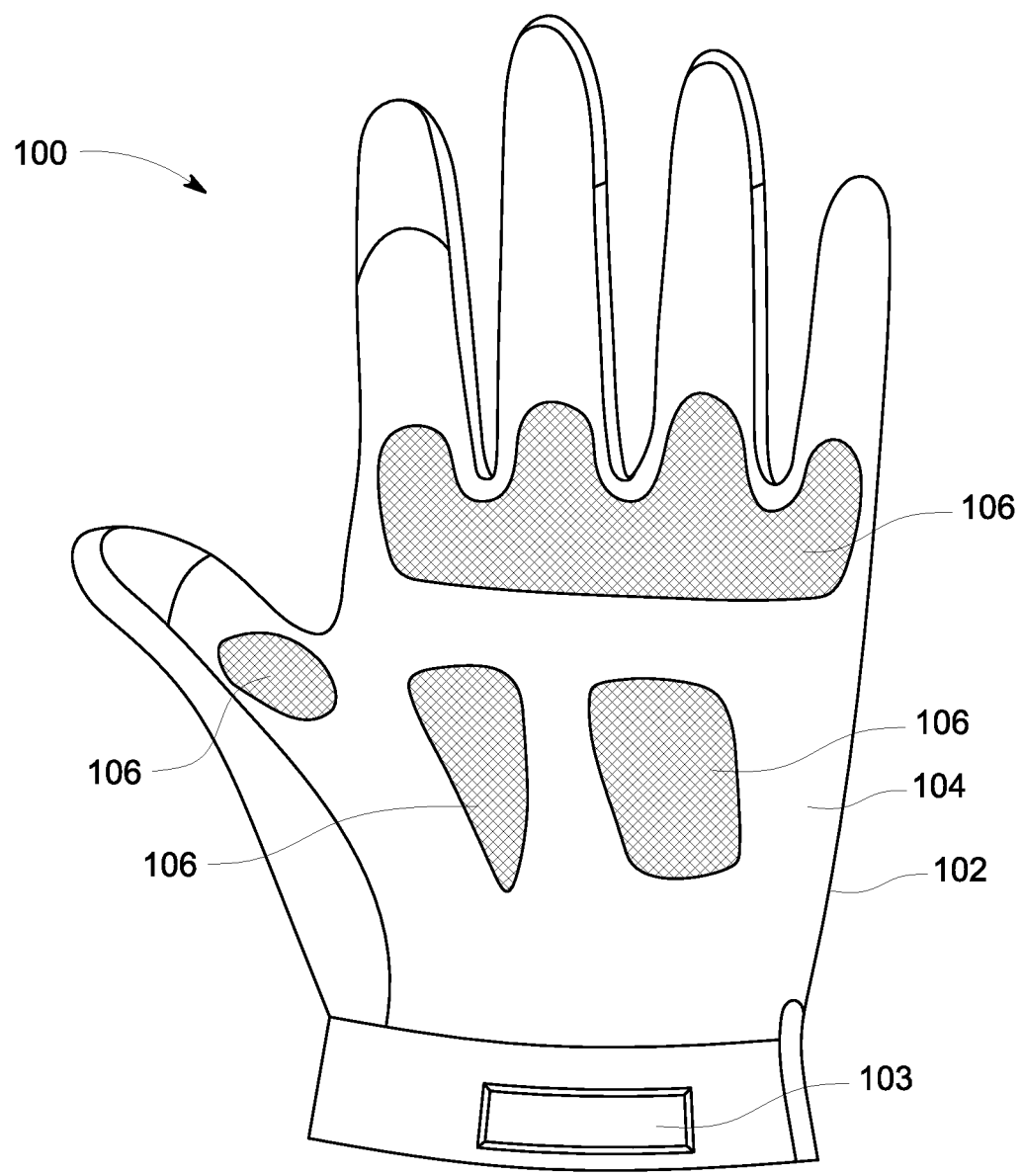
FIG. 1 illustrates a front view of a glove for incapacitating an individual in accordance with an embodiment of the present invention.

While this technology is illustrated and described in a preferred embodiment a glove worn by a user for incapacitating an individual may be produced in various shapes, sizes, colors, and configuration. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a front view of a glove 100 worn by a user for incapacitating an individual in accordance with a preferred embodiment of the present invention. Generally, an individual may be anything living such as a non-complaint individual or animal. The glove 100 includes a housing 102, a circuit control unit (202, shown in FIG. 2); and a disposable power source 103 for powering the circuit control unit (202 shown in FIG. 2).

The housing 102 is configured to cover palm and fingers of the user. The housing 102 includes a palm side layer 104 for covering the front part of the hand and a backside layer (204 shown in FIG. 2 and FIG. 3) for covering the back part of the hand. The circuit control unit (202 shown in FIG. 2) is explained in detail in conjunction with FIG. 2 of the present invention.

The portion of the palm side layer 104 is attached to the portion of the backside layer (204 shown in FIG. 2 and FIG. 3) for creating an opening to receive the hand. The palm side layer 104 is explained in detail in conjunction with FIG. 3 and FIG. 5 of the present invention. The backside layer (204 shown in FIG. 2 and FIG. 3) is explained in detail in conjunction with FIG. 2 and FIG. 3 of the present invention.

In a preferred embodiment of the present invention, the circuit control unit (202, shown in FIG. 2) is configured on the backside layer (204 shown in FIG. 2 and FIG. 3) having anesthesia electrical wave generator (604 shown in FIG. 6) for generating anesthesia electrical wave for incapacitating the individual. The disposable power source 103 is configured on the palm side layer 104. In a preferred embodiment of the present invention, the disposable power source 103 is near to the wrist of the user. The circuit control unit 202 may be of any size. In one embodiment, the circuit control unit 202 is about 66 mm long by about 27 mm wide by about 12 mm thick.

The palm side layer 104 includes a flexible electrode layer 106 configured to transfer the generated anesthesia electrical wave received from the circuit control unit (202 shown in FIG. 2) to the individual. The flexible electrode layers 106 are connected via circuit paths in the polymer film to the circuit control unit (202 shown in FIG. 2). Generally, the flexible electrode layer 106 consists of thin polymer films where a number of electrodes are embedded.

When at least two electrodes of the flexible electrode layer 106 come in contact with one another, an anesthesia electrical wave occurs. These electrodes may be placed anywhere on the glove 100. However, for exemplary purposes and as shown in FIG. 1, the electrodes are placed near the thumb joint, the palm, and knuckles.

In a preferred embodiment, the flexible electrode layers 106 are configured in the palm side layer 104 on the various areas such as just below the fingers, in the palm of the user, and in the thumb. The flexible electrode layers 106 provide the anesthesia electrical waves on the above mentioned areas to incapacitate the individual.

In one embodiment, model LIR2450 with two Lithium batteries form the battery cartridge that deliver the power for the anesthesia electrical waves. The total output of the cartridge is about 7.2V/120 mAh. The full charge of the battery may be about 8.2V and about 5.4V when the battery is low.

The flexible electrode layer 106 is an array based on thin polymer films and may be produced by using photolithography and typically consists of a sandwich of several layers of polymer and metal. It would be readily apparent to those skilled in the art that various metals such as copper, zinc, silver etc. may be envisioned for creating the flexible electrode layer 106 without deviating from the scope of the present invention.

The palm side layer 104 includes a first cutting resistance layer (302 shown in FIG. 3) configured beneath the flexible electrode layer 106 to protect the user's hand from foreign particles, a pressure sensor (304 shown in FIG. 3) configured beneath the first cutting resistance layer to activate the flexible electrode layer 106 only upon exceeding a prestored pressure value while grasping the individual by the user, and a first knitting cloth layer (308 shown in FIG. 3) is configured to be the innermost layer next to the palm of the user. The palm side layer 104 is explained in detail in conjunction with FIG. 3 of the present invention.

Figure 2:
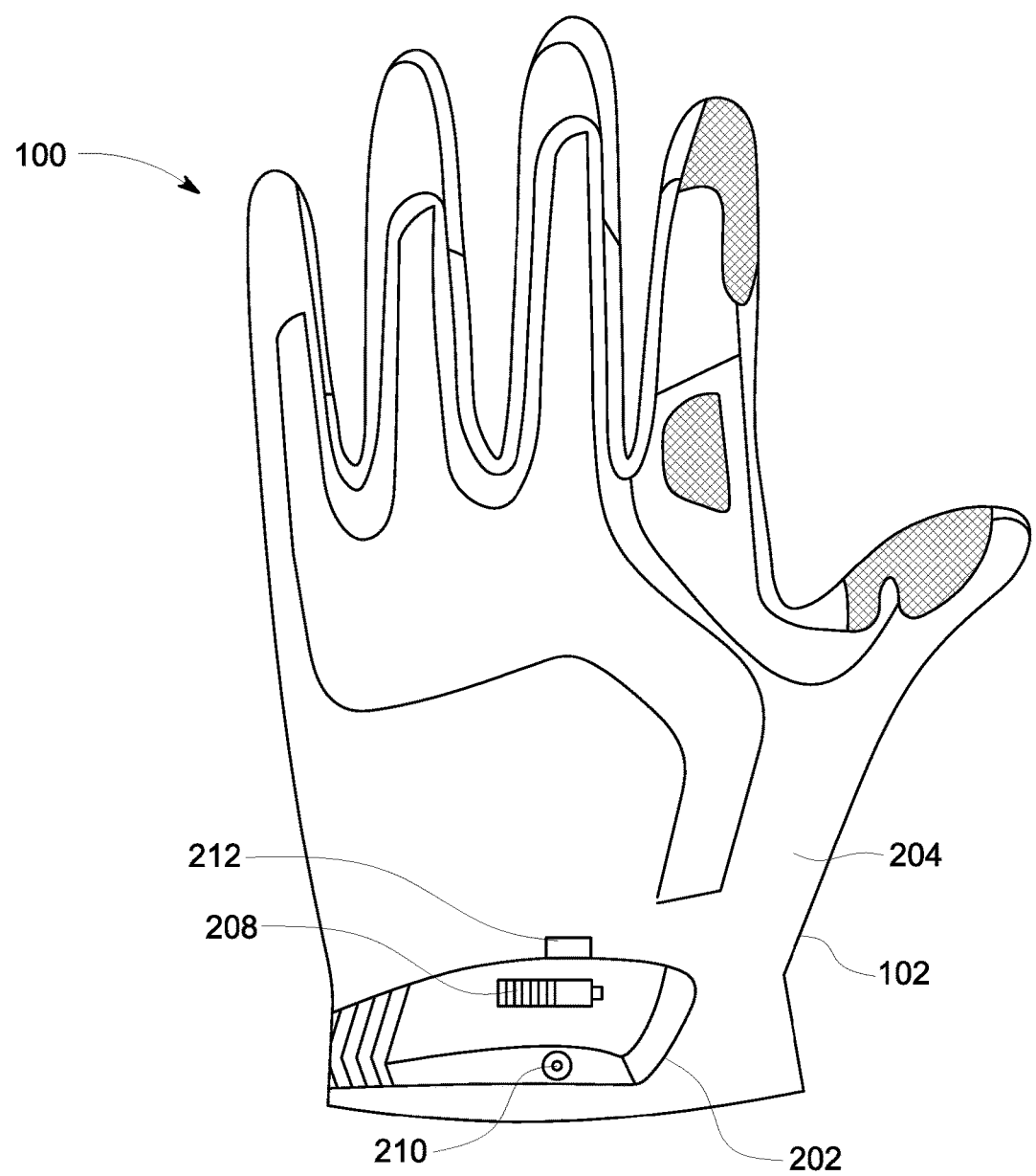
FIG. 2 illustrates a rear view of the glove for incapacitating the individual in accordance with an embodiment of the present invention.

FIG. 2 illustrates a rear view of the glove 100 in accordance with a preferred embodiment of the present invention. The glove 100 includes a circuit control unit 202 which generates a low amperage electrical pulse to provide the anesthesia effect on the individual through the flexible electrode layer (106 shown in FIG. 1 and FIG. 3), and a backside layer 204. In a preferred embodiment of the present invention, the anesthesia electrical wave produces shock ranges between about 320V to about 380V and current ranges between about 10 mA to about 30 mA.

In another preferred embodiment of the present invention, the glove 100 includes a display unit 208 configured on the circuit control unit 208 to display the status of the disposable power source 103. Further, the glove 100 includes a switch unit 210 configured on the backside layer 204 to control the disposable power source (103 shown in FIG. 1). The switch unit 210 is an on/off switch to either power on or power off the power source (103 shown in FIG. 1) which provides power to the circuit control unit 202.

The switch unit 210 may be located anywhere on the glove 100. The switch unit is about 3 mm by about 2 mm. In one embodiment, the switch unit 100 is located at the bottom of the pointer finger. The size and placement of the switch unit 210 may be adjusted according to the size and use of the glove 100.

In another preferred embodiment of the present invention, the glove 100 includes a light emitting source 212 configured in the housing 102 for generating a light to obstruct the vision of the individual before executing the grasp. The light emitting source 212 is connected to the circuit control unit 202 for receiving power and is operated through the switch unit 210.

In one embodiment, the light emitting source 212 is located on the circuit control unit 202. In another embodiment, the light emitting source 212 is located on the front edge of the circuit control unit 202. Examples of the light emitting source 212 may include but not limited to optical fiber illumination element, an organic LED, an electroluminesce (EL) element, an interferometric modulation (IMOD) element or a bulb. The wattage of the light when turned on may vary from about 30 to about 50 mW.

Figure 3:
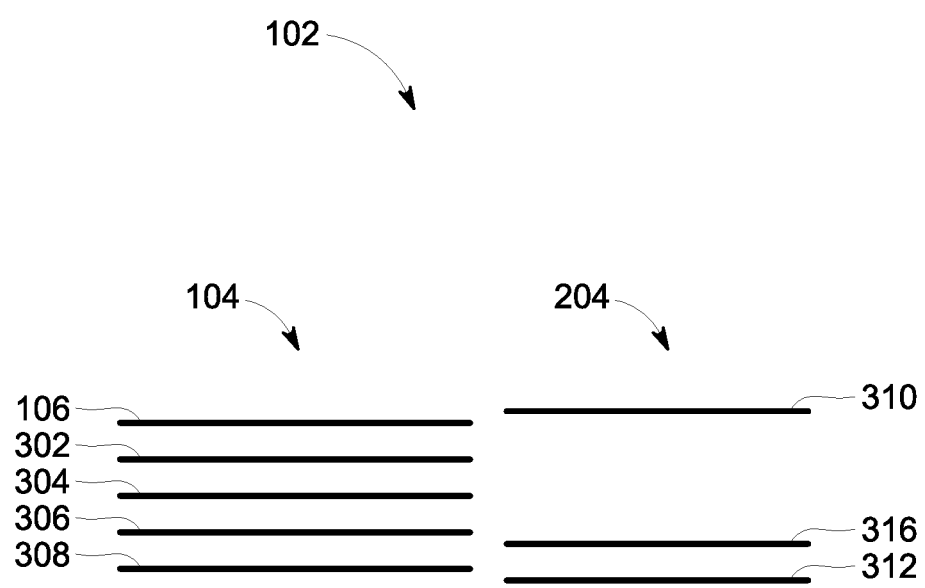
FIG. 3 illustrates a section view of the housing in accordance with an embodiment of the present invention.

FIG. 3 illustrates a sectional view of the housing 102 in accordance with a preferred embodiment of the present invention. The sectional view displays the layers of the housing 102. For the purpose of simplification and with reference to FIG. 1 of the present invention, the palm side layer 104 and the backside layer 204 are shown separately.

The flexible electrode layer 106 is the topmost layer and is configured on at least one portion of the first cutting resistance layer 302. The first cutting resistance layer 302 is configured to protect the user's hand from the penetration of foreign particles. Example of foreign particles includes but is not limited to pins, blade, cutter etc.

The first cutting resistance layer 302 may be of any material which is strong enough to prevent the penetration of the material. In an exemplary embodiment, the first cutting resistance layer 302 meets the 5$^{th}$ level of the cut resistant standard of Europe BS EN388:2003 regulation. The pressure sensor 304 is configured beneath the first cutting resistance layer 302 to activate the flexible electrode layer 106 only on exceeding pre-stored pressure value while grasping the individual by the user.

The pressure sensor 304 is formed in a form of a flexible layer disposed beneath the cutting resistance layer 302 to activate the flexible electrode layer 106 only on exceeding the pre-stored pressure value while grasping the user. In a preferred embodiment of the present invention, the pre-stored pressure value is about 190 gm. Therefore, the pressure sensor 304 is activated when the pressure while grasping the individual exceeds the 190 gm pressure.

In another preferred embodiment of the present invention, the palm side layer 104 further includes a water proof insulation layer 306 beneath the pressure sensor 304, and a first knitting cloth 308 is configured below the water proof insulation layer 306. The water proof insulation layer 306 prevents water leaking and soaking the inner part of the glove. It would be readily apparent to those skilled in the art that various materials may be envisioned for creating a water proof insulation layer 306 without deviating from the scope of the present invention.

The first knitting cloth 308 is configured below the water proof insulation 306 and as the innermost layer next to the palm of the user. Generally, the first knitting cloth 308 is created with a soft material such as cotton, foam etc to provide comfort to the user. The backside layer 204 includes a second knitting cloth layer 312 which is configured to be the innermost layer next to the back of the hand of the user.

Figure 4:
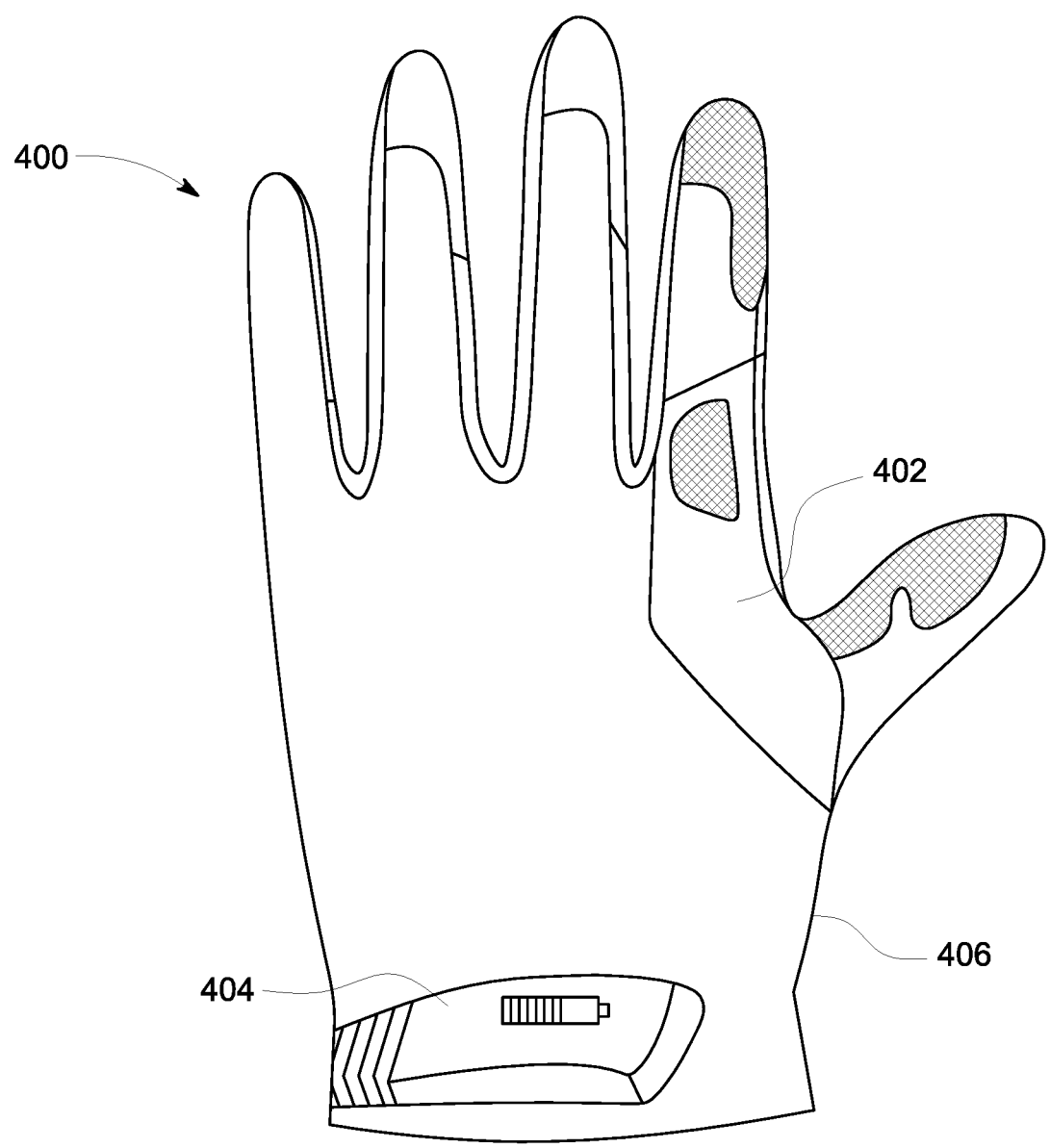
FIG. 4 illustrates a rear perspective view of the glove in accordance with an embodiment of the present invention.

In a preferred embodiment of the present invention, the backside leather layer is shown and explained in detail in conjunction with FIG. 4 of the present invention. The backside glove leather layer 310 and the second knitting cloth layer 312 are similar to the first cutting resistance layer 302 and the first knitting cloth layer 308, respectively of the present invention.

In another preferred embodiment of the present invention, the backside layer 204 includes a sponge cushioning layer 316 to provide protection to the back of the hand and the finger nails. Preferably, the sponge cushioning layer 316 is like a sponge-like or foam-like material which is soft and flexible for absorbing impact and providing protection to the finger nails. Moreover, the sponge cushioning layer 316 is water proof similar to the water proof insulation layer 306. Being that both the material for the sponge cushioning layer 316 and the water proof insulation layer 306 are waterproof. These two layers may or may not be the same material.

FIG. 4 illustrates a rear perspective view of the glove 400 in accordance with another preferred embodiment of the present invention. The glove 400 includes a leather layer 402 to provide puncture resistant leather layer from the foreign particles. The glove 400 further includes a circuit control storage area 404 to store the circuit control unit (208, shown in FIG. 2). The leather layer 402 is formed on the backside layer 406. The backside layer 406 (also shown as 204 in FIG. 2 and FIG. 3) is explained in detail in conjunction with the FIG. 2 and FIG. 3 of the present invention.

Figure 5:
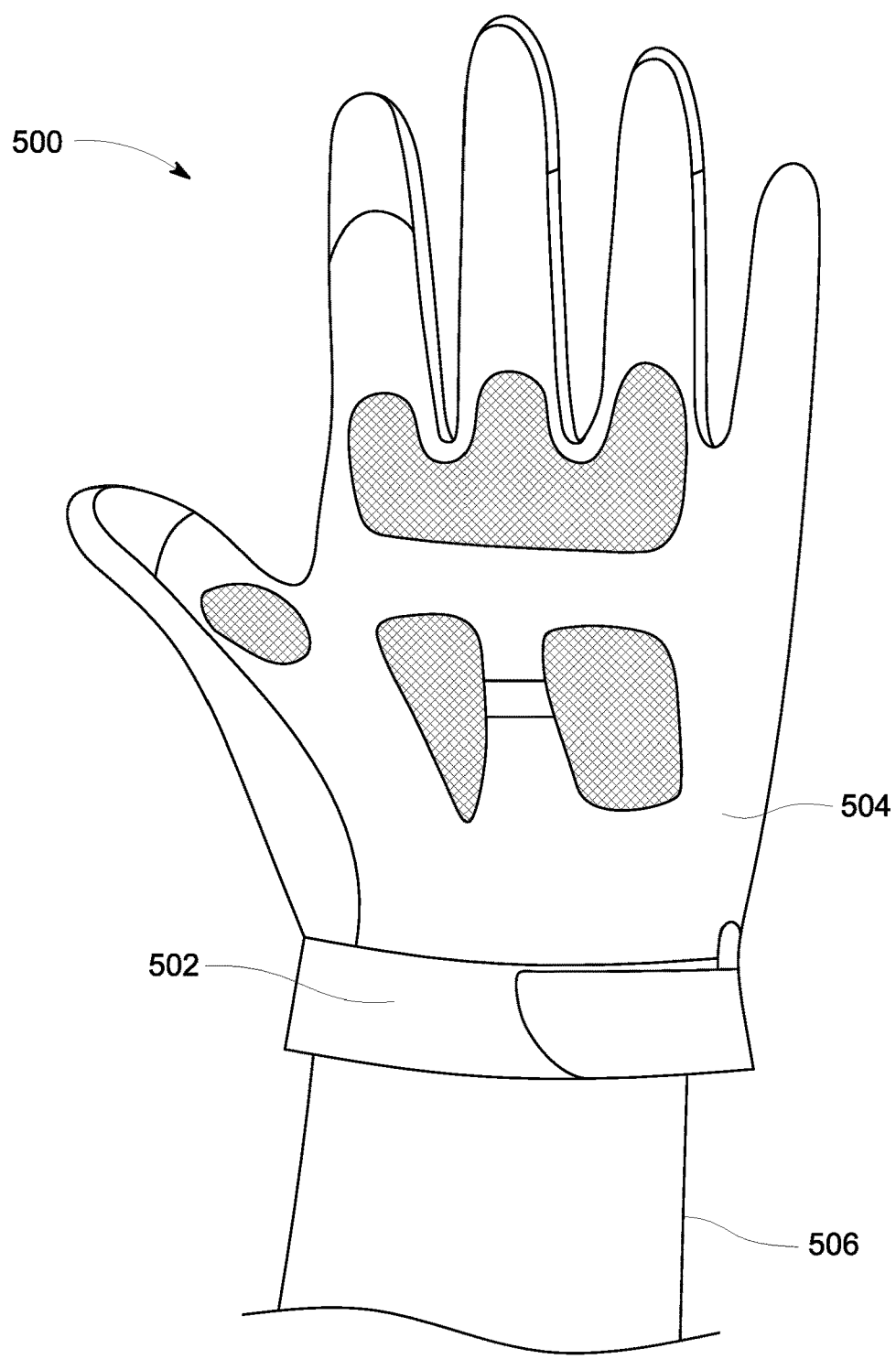
FIG. 5 illustrates a front perspective view of the glove in accordance with an embodiment of the present invention.

FIG. 5 illustrates a front perspective view of the glove 500 in another preferred embodiment of the present invention. The glove 500 includes an attachment unit 502 to attach the housing 504 around the wrist 506 of the user. In a preferred embodiment of the present invention, the attachment unit 502 is a Velcro unit. However, it would be readily apparent to those skilled in the art that various attachment units 502 may be envisioned without deviating from the scope of the present invention.

Figure 6:
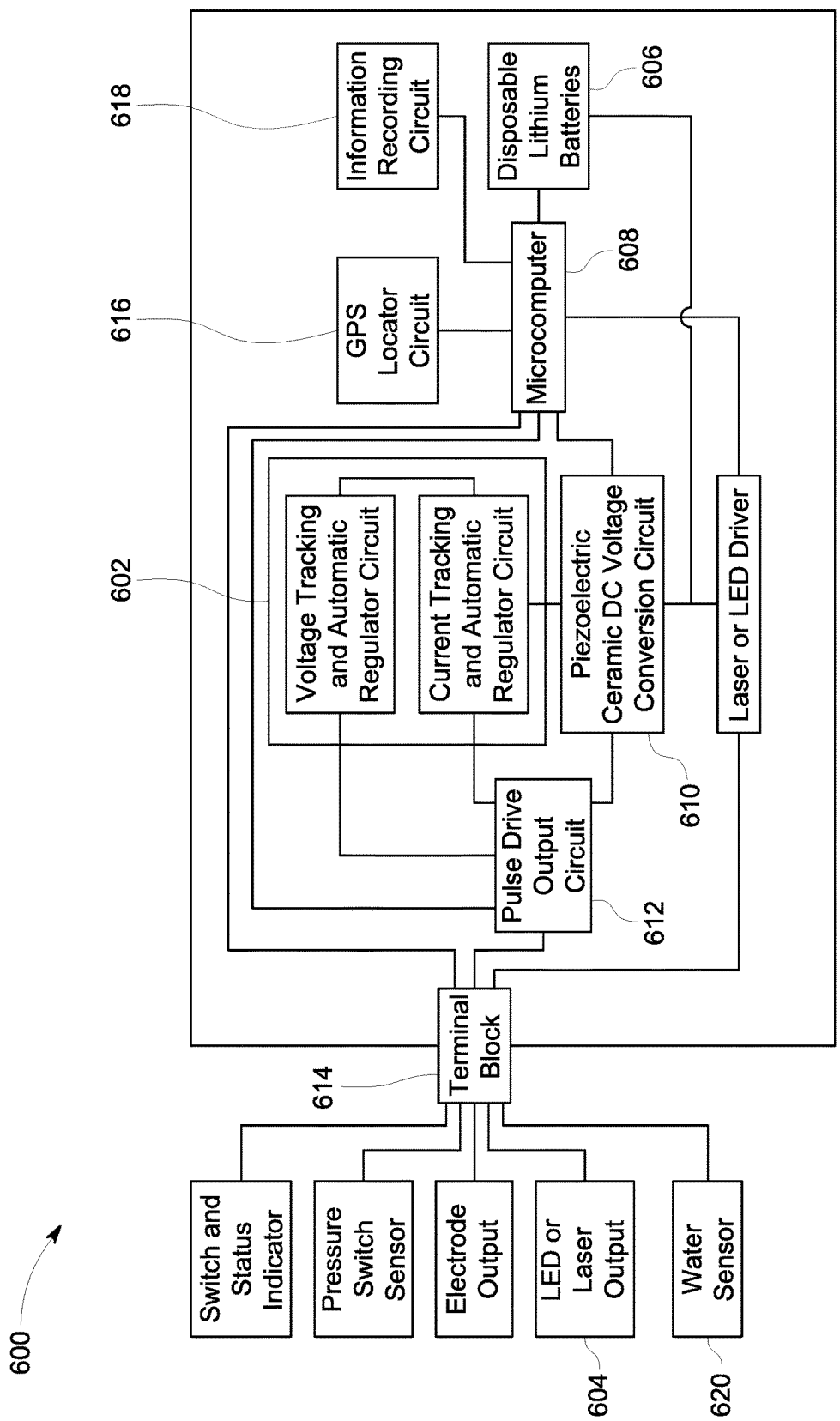
FIG. 6 illustrates a block diagram to show the circuit control unit in accordance with an embodiment of the present invention.

FIG. 6 illustrates a block diagram for a circuit control unit 600 in accordance with another preferred embodiment of the present invention. The circuit control unit 600 includes a tracking unit 602 to track the usage of time of the power source (103 shown in FIG. 2). The tracking unit 602 further includes a Voltage/Current Tracking and Automatic Regulator Circuit to track the voltage and current running through the flexible electrode layer (106 shown in FIG. 1 and FIG. 3) generated from the electrical wave generator 604.

The anesthesia electrical wave generator 612 uses a disposable power source 606 (also shown as 103 in FIG. 1). Further, the circuit control unit 600 includes a microcomputer 608 designed as the core for the automation control using a piezoelectric ceramic DC voltage conversion circuit 610 to transform the electrical anesthesia energy combined with the tracking unit 602 through the pulse drive output circuit 612 to couple the output of the flexible electrode layer (106 shown in FIG. 1 and FIG. 3) to the housing (102 shown in FIG. 1, FIG. 2 and FIG. 3).

The circuit control unit 600 further includes a terminal block 614 that acts a blocking module using the waterproof plugs to connect to the outside connectors. Further, the circuit control unit 600 includes a GPS locator circuit 616 to track the device usage time, length, and location parameters. Further, circuit control unit 600 has information recording circuit 618 to record all the information which may be retrieved for future references.

In another preferred embodiment of the present invention, the circuit control unit 600 further includes a water sensor 620 to detect soaking level of the housing (102 show in FIG. 1, FIG. 2 and FIG. 3). The water sensor 620 shuts down the power to the anesthesia electrical wave generator 608 from the disposable power source 606 on recording soaking level higher than the pre-stored soaking level. In one embodiment, the water sensor 620 shuts down the power when 100% moisture is reached.

The present invention offers various advantages. The invention is non-lethal tool used by law enforcement and corrections community as an alternative means to subdue a non-complaint individual without the use of lethal force. Further, the present invention offers to incapacitate the non-compliant individual instantly and safely without any lasting physical effects to the non-complaint individual or involved officer.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A glove worn by a user for incapacitating an individual comprising:
   a housing configured to cover palm and fingers of the user, the housing having a palm side layer for covering a front part of a user's hand and a backside layer for covering a back part of the user's hand, wherein portions of the palm side layer are attached to a portion of the backside layer to create an opening for receiving the user's hand;
   a circuit control unit configured on the backside layer having an anesthesia electrical wave generator for generating an anesthesia electrical wave for incapacitating the individual, wherein the circuit control unit comprises:
   a water sensor to detect a soaking level of the housing; wherein the water sensor further shuts down power to the anesthesia electrical wave generator on recording the soaking level higher than a pre-stored soaking level;
   a disposable power source configured on the palm side layer to power the circuit control unit; wherein the palm side layer comprises:
   a first cutting resistance layer to protect the user's hand from foreign particles;
   a flexible electrode layer configured on at least one portion of the first cutting resistance layer to transfer the generated anesthesia electrical wave received from the anesthesia electrical wave generator to the individual;
   a pressure sensor configured beneath the first cutting resistance layer to activate the flexible electrode layer only on exceeding a pre-stored pressure value while grasping the individual by the user;
   a water proof insulation layer beneath the pressure sensor for preventing water leaking and soaking the flexible electrode layer; and
   a first knitting cloth layer configured to be an innermost layer next to the palm of the user; wherein the backside layer comprises:
   a backside leather layer configured to protect the user's hand; and
   a second knitting cloth layer configured to be the innermost layer next to the back part of the user's hand.

2. The glove according to claim 1 further comprising a circuit control storage unit configured to store the circuit control unit in the backside layer of the housing.

3. The glove according to claim 1 further comprising a display unit configured on the circuit control unit to display a status of the disposable power source.

4. The glove according to claim 1 further comprising a switch unit configured in the circuit control unit for allowing the user to control the disposable power source.

5. The glove according to claim 1 wherein the circuit control unit further comprising a tracking unit to track usage time of the disposable power source.

6. The glove according to claim 5 wherein the tracking unit further tracks location of the housing.

7. The glove according to claim 5, wherein the tracking unit further records the usage time information and housing location information.

8. The glove according to claim 1 further comprising a light emitting source configured in the housing for generating a light to obstruct vision of the individual before executing a grasp by the user, further the light emitting source connected to a switch unit and the disposable power source.

9. The glove according to claim 1 wherein the anesthesia electrical wave produces shock ranges between 320V to 380V and current ranges between 10 mA to 30 mA.

10. The glove according to claim 1 wherein the pre-stored pressure value on the pressure sensor is 190 gm.

* * * * *